(No Model.)
W. C. WALKER.
MACHINE FOR MAKING WIRE AND PICKET FENCES.
No. 347,668. Patented Aug. 17, 1886.
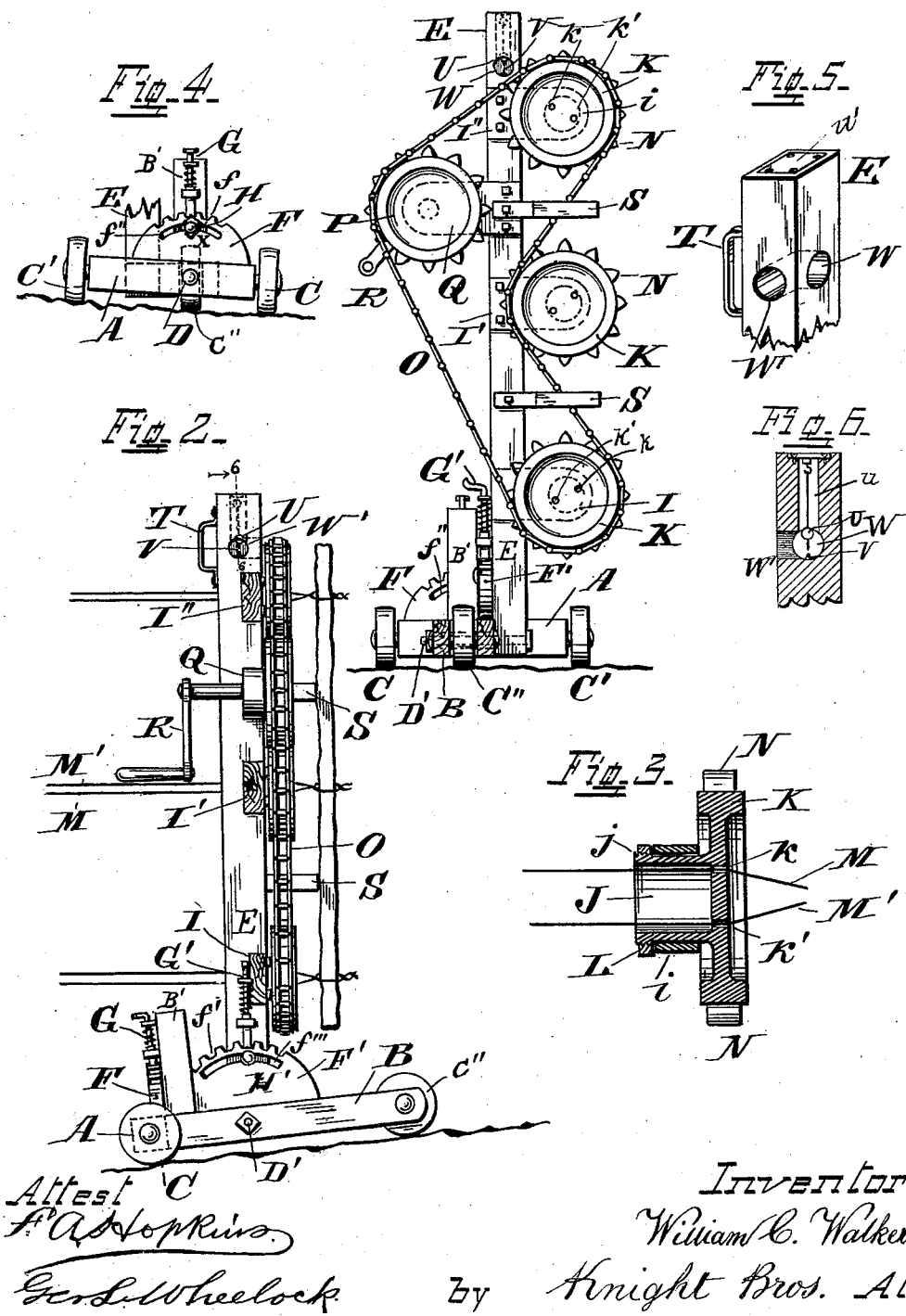
Attest
F. A. Hopkins
Geo. L. Wheelock
Inventor
William C. Walker.
by Knight Bros. Atty's

United States Patent Office.

WILLIAM C. WALKER, OF PATRIOT, INDIANA, ASSIGNOR OF TWO-THIRDS TO STEPHEN J. DIBBLE AND PETER R. LOSTUTTER, BOTH OF SAME PLACE.

MACHINE FOR MAKING WIRE-AND-PICKET FENCES.

SPECIFICATION forming part of Letters Patent No. 347,668, dated August 17, 1886.

Application filed March 18, 1886. Serial No. 195,709. (No model.)

*To all whom it may concern:*

Be it known that I, WILLIAM C. WALKER, of Patriot, Switzerland county, Indiana, have invented a new and useful Improvement in Machines for making Wire-and-Picket Fences, of which the following is a specification.

My invention relates to improvements in the class of machines which are used to twist the one or more pairs of coupled wires about the successive slats or pickets employed in combined wire-and-picket fences.

In the accompanying drawings, Figure 1 is a front view, and Fig. 2 is a side view, of a machine embodying my improvements. Fig. 3 is an axial section of one of my twisting-wheels. Fig. 4 is a rear view of the lower part of the machine. Fig. 5 is a perspective view of the top of the standard. Fig. 6 is a vertical section on the line 6 6, Fig. 2, looking in the direction of the arrow, showing the plumb-indicator in elevation, and on a somewhat larger scale.

A B is a T-formed frame of a truck, which is supported on three wheels, C C' C'', of which two are journaled to the ends of the part A, corresponding to the head of the letter T, and one wheel, C'', is journaled to the free end of the part B, corresponding to the stem of the same letter. All these wheels are so journaled as to revolve in planes parallel with the fence-line. The part B is secured, by a king-bolt, D, to the part A, so as to be capable of angular adjustment relatively thereto in a vertical plane at right angles to the line of fence, in order to enable perpendicularity of the standard E to be maintained on ground which slopes from right to left or from left to right. The said standard is so fastened by a king-bolt, D', at its lower end to the part B, as to enable perpendicularity of the standard to be maintained on ground that slopes in direction of the fence-line. To enable the standard to be securely fixed at this compound adjustment, I provide a transverse segment-rack, F, and a fore-and-aft segment-rack, F', whose notched peripheries $f$ $f'$ receive spring-bolts G G'. Studs H H', that project horizontally from the standard, occupy arc-slots $f''$ $f'''$ in the segment-plates concentric with the respective king-bolts. A series of identically similar brackets, I I' I'', that project laterally from the standard, have circular necks $i$, which serve as bearings for the hollow journals J of as many twisting-wheels K. These journals are screw-threaded, as at $j$, to receive nuts or screw-threaded collars L, which serve to secure the journals within said bearings. Each twisting-wheel has at equal distances from its center two diametrically remote orifices, $k$ $k'$, for the wires M M' of one couple, one wire being rove through each respective orifice. The hollows or bores of the wheels K are of somewhat greater caliber than the outside distance apart of the orifices $k$ $k'$, in order to allow free extension forward of the stretched wires, as seen in Fig. 3. The peripheries of the twisting-wheels are armed with cogs N for an endless chain O, that gives them a driving-connection with a sprocket, P, journaled in a bracket, Q, that projects from the opposite side of the standard. This sprocket has a winch, R, which the operator rotates alternately to the right and to the left for the consecutive pickets in the usual way for twisting such coupled wires about fence-pickets. Tongues S, that project from the standard, do duty as stays or abutments for the forward edge of the picket about which the wires are being twisted. A handle, T, may be secured to the standard, to facilitate adjustment and steadying of the implement by the operator.

The provision of three wheels, C C' C'', secures stability of the machine against disturbing influences from any direction and however uneven the ground.

To facilitate plumbing the post, I form in the upper end of the standard E a longitudinal bore, $u$, and transverse bores or sight-apertures W W', which communicate with the lower extremity of said longitudinal bore, being formed in the standard at right angles to each other. The upper end of this longitudinal bore is covered by a plate, $u'$, from the under side of which depends a plumb, U, provided with or terminating on its under side in a point, which, when said standard is vertical, registers with a point, V, projecting upward from the bottom of the bore.

One or both of the studs H H' may be screw-threaded and carry a nut, X, to enable rigid fastening of the standard to its adjustment relatively to the truck.

I claim as new and of my invention—

1. In a machine for twisting the coupled wires of combined wire-and-picket fences, the combination, with the T-shaped frame A B, coupled together by a king-bolt, D, and provided with wheels C C' C'', of the standard E, the king-bolt D', by which said standard is secured to said frame, means for holding said parts in the position in which they are set, and the twisting-device carried by the standard, substantially as set forth.

2. In a machine for twisting the coupled wires of a picket fence, the wire-twisting wheel K, having diametrically-opposite orifices K K' of less distance apart than the caliber of the hollow journal J, said journals being retained in the hollow necks i of brackets I by collars L, as set forth.

3. In a machine for twisting the coupled wires of combined wire-and-picket fences, the combination, with the base-frame, of a standard rising therefrom and adjustable in vertical planes at right angles to each other, fastenings for securing the parts in any position in which they are set, and the twisting device carried by said standard, substantially as set forth.

4. In a machine for making wire fences, the combination, with the base-frame and a standard secured thereto so as to be adjustable in a vertical plane, and having a longitudinal bore and transverse sight-apertures, of a plumb depending in said bore and the point arranged beneath said plumb, substantially as set forth.

In testimony of which invention I hereunto set my hand.

WILLIAM C. WALKER.

Attest:
GEO. H. KNIGHT,
N. ROCKHOLD.